Nov. 19, 1957 W. WALLIN 2,813,460
SINUSOIDAL LIGHT CHOPPER
Filed Jan. 18, 1954 2 Sheets-Sheet 1

INVENTOR.
WALTER WALLIN
BY
ATTORNEYS

Nov. 19, 1957  W. WALLIN  2,813,460
SINUSOIDAL LIGHT CHOPPER
Filed Jan. 18, 1954  2 Sheets-Sheet 2

INVENTOR.
WALTER WALLIN
BY
ATTORNEYS

United States Patent Office 2,813,460
Patented Nov. 19, 1957

2,813,460

SINUSOIDAL LIGHT CHOPPER

Walter Wallin, Canoga Park, Calif., assignor to the United States of America as represented by the Secretary of the Navy Application January 18, 1954, Serial No. 404,817

8 Claims. (Cl. 88—61)

(Granted under Title 35, U. S. Code (1952), sec. 266)

The invention described herein may be manufactured and used by or for the Government of the United States of America for governmental purposes without the payment of any royalties thereon or therefor.

This invention relates to devices for modulating light flux, and in particular to a device for sinusoidally varying the rate of flow of light energy through a surface.

In the testing of photosensitive cells, such as lead sulfide cells, to determine their frequency response characteristics it is desirable to sinusoidally modulate the light flux incident on such photosensitive material.

Light flux can be modulated by varying the optical brightness of the source or by varying the amount of light energy passing through an aperture. The amount of light energy passing through an aperture can be varied by changing the optical density of the aperture or by varying the area of the aperture. This invention relates to a device in which the area through which light energy is transmitted is sinusoidally varied.

It is therefore an object of this invention to provide an improved device for sinusoidally modulating light flux.

It is a further object of this invention to provide a device for modulating light flux in accordance with a finite number of sinusoidal terms.

It is a further object of this invention to provide a device for sinusoidally modulating light flux which is relatively simple, efficient, and positive in action.

Figure 1:
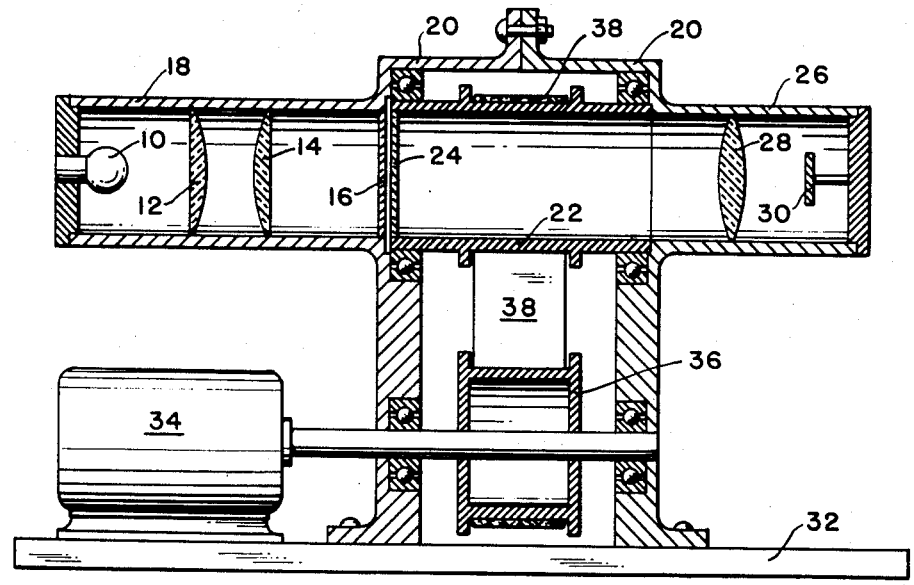
Figures 4, 5:
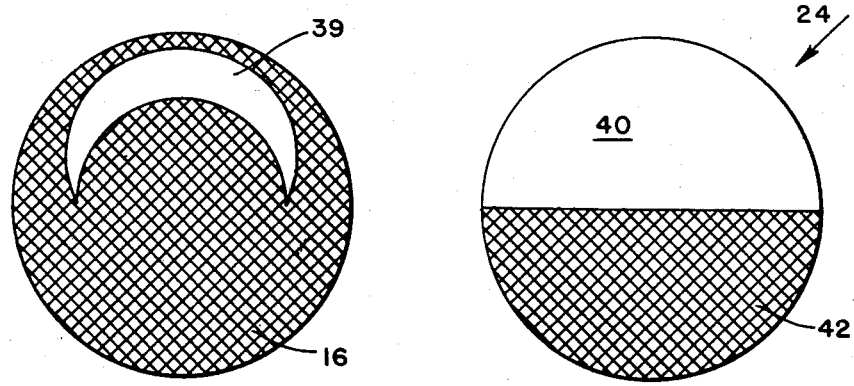
Figure 2:
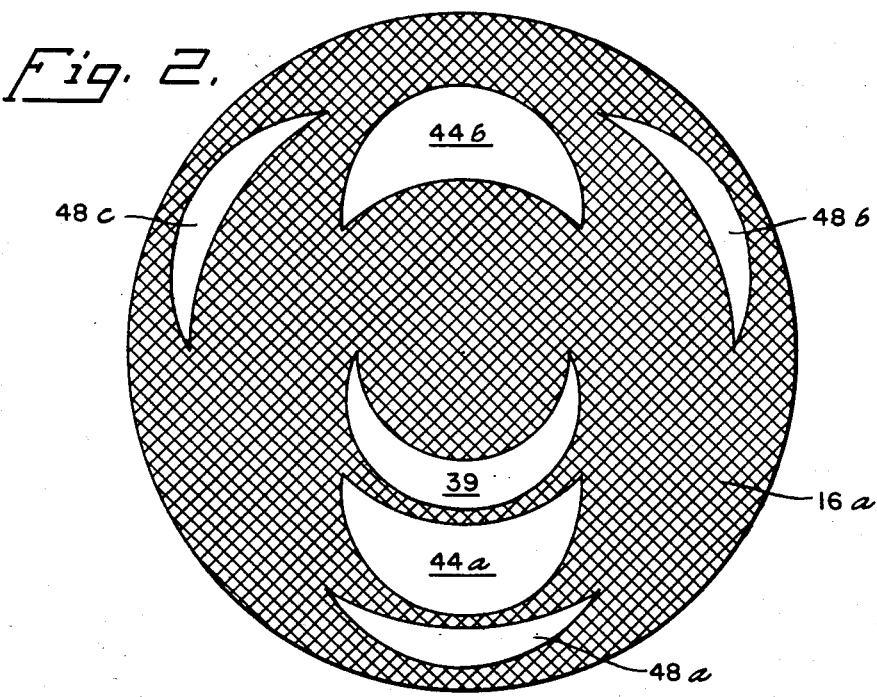
Figure 3:
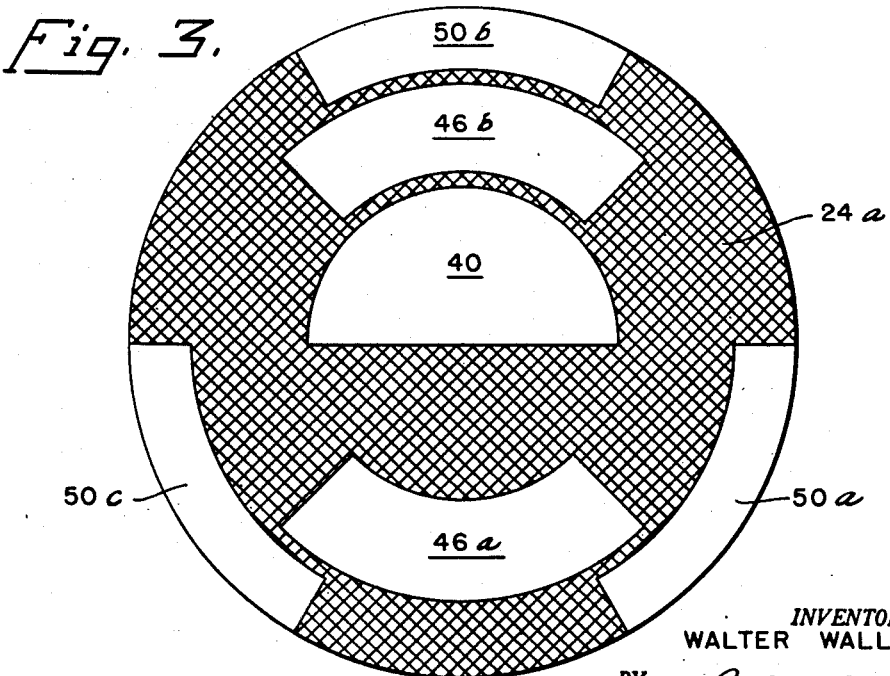

Other objects and many of the attendant advantages of this invention will be readily appreciated as the same become better understood by reference to the following detailed description when considered in connection with the accompanying drawing wherein:

Fig. 1 is a sectional view of a sinusoidal light chopper;
Fig. 2 is an enlarged plan view of an aperture plate;
Fig. 3 is an enlarged plan view of a sector scanning disc;
Fig. 4 shows the inner zone of the aperture plate of Fig. 2; and
Fig. 5 shows the inner zone of the sector scanning disc of Fig. 3.

Referring to Fig. 1 wherein one form of an improved sinusoidal light modulator is illustrated, light energy from source 10, such as an incandescent bulb, is formed into a beam of substantially parallel light by optical lenses 12 and 14. The luminous energy per unit cross-sectional area of the beam is substantially constant. The beam of light falls upon aperture plate 16 which is fixedly mounted within closed cylinder member 18. The illumination, radiant energy per unit area per unit time, of plate 16 is substantially constant. Source 10 and lenses 12 and 14 are also mounted within member 18, and member 18 may be made integral with frame 20. Hollow spindle 22 is mounted for rotation within frame 20, and its axis of rotation is substantially coincident with the axis of cylindrical member 18. Sector scanning disc 24 is fixedly mounted within spindle 22 and as close to aperture plate 16 as it is physically feasible to do in order to avoid errors from light rays which may not be exactly parallel to the axis of spindle 22. Hollow cylinder member 26 may be made integral with frame 20 and has its axis substantially coincident with the axis of cylinder member 18 and the axis of rotation of spindle 22. Optical lens 28 mounted within member 26 focuses all the light that passes through aperture plate 16 and scanning disc 24 onto the photosensitive material 30 which is being tested. Frame 20 is fixedly mounted on base 32 to which is also secured a variable speed electric motor 34. Motor 34 is operatively connected to spindle 36 which is rotatively mounted within frame 20. The axis of rotation of spindle 36 is parallel to the axis of rotation of spindle 22. Spindle 22 is rotated by spindle 36 by means of belt 38.

It can be shown mathematically that if the light transmitting area, or areas, of aperture plate 16 are bounded by curves in polar coordinates of the form (1) $\quad r=(a \cos n\theta+b)^{1/2}$ and if aperture plate 16 is scanned by sector scanning disc 24 having $n$ light transmitting sectors and $n$ opaque sectors alternately spaced with each sector having an angular opening of $\pi/n$ radians, the total area, A, through which light can be transmitted through aperture plate 16 and scanning disc 24 is (2) $\quad A=c+d \sin n\theta$ In the above equations $n$ is an integer other than zero, $a$ and $b$ are constants, or design parameters, and $c$ and $d$ are functions of $a$, $b$ and $n$. The angle $\theta$ may be defined as the angular orientation of the leading edge of one of the sectors of the scanning disc. It also can be shown that the total area A through which light can be transmitted through aperture plate 16 and scanning disc 24 is a function of $\sin n\theta$ when the light transmitting area, or areas, of aperture plate 16 are bounded by two intersecting curves of the form (3) $\quad r=(a \cos n\theta+b)^{1/2}$ when $n$ has the same value in the two equations which bound the transparent area, or areas. If aperture plate 16 is uniformly illuminated and if uniform relative rotation takes place between aperture plate 16 and scanning disc 24, the light flux passing through the aperture plate 16 and scanning disc 24 will be sinusoidally modulated.

To modulate the light flux in accordance with a plurality of terms of a Fourier series, the aperture plate and scanning disc are divided into an equal number of substantially equal sized concentric zones, one zone being used for each term of the series. In Fig. 2 a typical aperture plate for modulating light flux in accordance with three terms of a sine series is illustrated. In Fig. 3 the matching sector scanning disc is shown. To facilitate understanding the invention the inner zone of the aperture plate and scanning disc of Figs. 2 and 3 are shown in Figs. 4 and 5.

The transparent area 39 of aperture plate 16 is defined by two equations of the form (4) $\quad r=(a \cos \theta+b)^{1/2}$ The outer curve is (5) $\quad r=(5 \cos \theta+4)^{1/2}$ and the inner curve is (6) $\quad r=2$ Since $n=1$ in the above equations the angular opening of the transparent sector 40 of scanning disc 24 is $\pi$ radians. Sector 42 of the inner zone of disc 24 is opaque.

The transparent areas 44a, 44b of aperture plate 16 in the second, or middle, zone are defined by (7) $\quad r=(14.76 \cos 2\theta+10.24)^{1/2}$ and (8) $\quad r=3.2$ The transparent sector 46a, 46b of scanning disc 24 have an angular extent of $\pi/2$ radians. The transparent areas 48a, 48b, 48c of the third zone are defined by (9) $\quad r=(8.96 \cos 3\theta+27.04)^{1/2}$ and

(10) $\quad r=5.2$

The transparent sectors 50a, 50b, 50c of the third zone of scanning disc 24 have an angular extent of $\pi/3$ radians.

Sinusoidally modulated light flux differs from a mathematical sine function since the light flux cannot assume negative values and the mathematical function can. As terms of a series are added, the value of the constant term is increased. The effect is that of reproducing the desired curve with a D. C. bias. As a result the form of the function can be exactly represented in terms of illumination but the constant term of the function cannot be controlled.

Aperture plate 16 and scanner disc 24 can be made by a photoengraving process in which by the use of bichromated gelatin the patterns are etched in a surface of silver on glass. The desired patterns can be prepared by photographic reduction of hand drawn masters.

Obviously many modifications and variations of the present invention are possible in the light of the above teachings. It is therefore to be understood that within the scope of the appended claims the invention may be practiced otherwise than as specifically described.

What is claimed is:

1. An apparatus for modulating the cross-sectional area of a beam of radiant energy propagated along a reference axis, comprising: a pair of planar members, each formed of material opaque to said radiant energy; said members being aligned upon and positioned perpendicularly to said reference axis; said members each having a reference origin defined therein by intersection of said reference axis therewith; one said member having plural concentric zones, each zone encompassing at least one symmetrical aperture transparent to said radiant energy; said aperture in any given zone having an angular width equal to $\pi/n$ radians and being bounded by a first curve defined by a polar equation of the form $$r=(a \cos n\theta+b)^{1/2}$$

and an intersecting curve of the form $r=b^{1/2}$, wherein $r$ is the radius vector, $\theta$ is the polar angle, $a$ and $b$ are any constants of values suitable to confine the resultant aperture within said given zone, constant $b$ having the same value in both equations, and $n$ is any integer other than zero; the other said member having corresponding like zones, each encompassing at least one window transparent to said radiant energy; said window having an angular width equal to that of an aperture in the corresponding zone of said one said member, and further defined as an annular sector having radial straight-sided extremities, an inner arc of radius at least as small as the minimum radius vector of that aperture, and an outer arc of radius at least as large as the maximum radius vector of that aperture; and means for relatively rotating said members uniformly about said reference axis.

2. An apparatus for modulating the cross-sectional area of a beam of radiant energy propagated along a reference axis, comprising: a pair of planar members, each formed of material opaque to said radiant energy; said members being aligned upon and positioned perpendicularly to said reference axis; said members each having a reference origin defined therein by intersection of said reference axis therewith; one said member having plural concentric zones, each zone encompassing $n$ uniformly-spaced symmetrical apertures transparent to said radiant energy; each said aperture in any given zone having an angular width equal to $\pi/n$ radians and being bounded by a first curve defined by a polar equation of the form $$r=(a \cos n\theta+b)^{1/2}$$

and an intersecting curve of the form $r=b^{1/2}$, wherein $r$ is the radius vector, $\theta$ is the polar angle, $a$ and $b$ are any constants of values suitable to confine the resultant aperture within said given zone, constant $b$ having the same value in both equations, and $n$ is any integer other than zero; the other said member having corresponding like zones, each encompassing $n$ uniformly-spaced windows transparent to said radiant energy; each said window in any given zone having an angular width equal to that of an aperture in the corresponding zone of said one said member, and further defined as an annular sector having radial straight-sided extremities, an inner arc of radius at least as small as the minimum radius vector of that aperture, and an outer arc of radius at least as large as the maximum radius vector of that aperture; and means for relatively rotating said members uniformly about said reference axis.

3. An apparatus for modulating the cross-sectional area of a beam of radiant energy propagated along a reference axis, comprising: a pair of planar members, each formed of material opaque to said radiant energy; said members being aligned upon and positioned perpendicularly to said reference axis; said members each having a reference origin defined therein by intersection of said reference axis therewith; one said member having plural concentric zones, each zone encompassing at least one symmetrical aperture transparent to said radiant energy; said aperture in any given zone having an angular width equal to $\pi/n$ radians and being bounded by two intersecting curves defined by two polar equations of the general form $r=(a \cos n\theta+b)^{1/2}$, wherein $r$ is the radius vector, $\theta$ is the polar angle, $a$ and $b$ are any constants of values suitable to confine the resultant aperture within said given zone, constant $b$ having the same value in both equations, and $n$ is any integer other than zero and having the same value in both equations; the other said member having corresponding like zones, each encompassing at least one window transparent to said radiant energy; said window having an angular width equal to that of an aperture in the corresponding zone of said one said member, and further defined as an annular sector having radial straight-sided extremities, an inner arc of radius at least as small as the minimum radius vector of that aperture, and an outer arc of radius at least as large as the maximum radius vector of that aperture; and means for relatively rotating said members uniformly about said reference axis.

4. An apparatus for modulating the cross-sectional area of a beam of radiant energy propagated along a reference axis, comprising: a pair of planar members, each formed of material opaque to said radiant energy; said members being aligned upon and positioned perpendicularly to said reference axis; said members each having a reference origin defined therein by intersection of said reference axis therewith; one said member having plural concentric zones, each zone encompassing $n$ uniformly-spaced symmetrical apertures transparent to said radiant energy; each said aperture in any given zone having an angular width equal to $\pi/n$ radians and being bounded by two intersecting curves defined by two polar equations of the general form $r=(a \cos n\theta+b)^{1/2}$, wherein $r$ is the radius vector, $\theta$ is the polar angle, $a$ and $b$ are any constants of values suitable to confine the resultant aperture within said given zone, constant $b$ having the same value in both equations, and $n$ is any integer other than zero and having the same value in both equations; the other said member having corresponding like zones, each encompassing $n$ uniformly-spaced windows transparent to said radiant energy; each said window in any given zone having an angular width equal to that of an aperture in the corresponding zone of said one said member, and further defined as an annular sector having radial straight-sided extremities, an inner arc of radius at least as small as the minimum radius vector of that aperture, and an outer arc of radius at least as large as the maximum radius vector of that aperture; and means for relatively rotating said members uniformly about said reference axis.

5. An apparatus for modulating the cross-sectional area of a beam of radiant energy propagated along a reference axis, comprising: a pair of planar members, each formed of material opaque to said radiant energy; said members being aligned upon and positioned perpendicularly to said reference axis; said members each having a reference origin defined therein by intersection of said reference axis therewith; one said member having formed therein at least one symmetrical aperture transparent to said radiant energy, having an angular width equal to $\pi/n$ radians and bounded by two intersecting curves defined by two polar equations of the general form $$r = (a \cos n\theta + b)^{1/2}$$

wherein $r$ is the radius vector, $\theta$ is the polar angle, $a$ is any constant differing in the two equations, $b$ is any constant having the same value in both equations, and $n$ is any integer other than zero and having the same value in both equations; the other said member having at least one window transparent to said radiant energy, of like angular width, and further defined as an annular sector having radial straight-sided extremities, an inner arc of radius at least as small as the minimum radius vector of said aperture, and an outer arc of radius at least as large as the maximum radius vector of said aperture; and means for relatively rotating said members uniformly about said reference axis.

6. An apparatus for modulating the cross-sectional area of a beam of radiant energy propagated along a reference axis, comprising: a pair of planar members, each formed of material opaque to said radiant energy; said members being aligned upon and positioned perpendicularly to said reference axis; said aperture plate and scanning disc each having a reference origin defined therein by intersection of said reference axis therewith; one said member having formed therein $n$ uniformly-spaced symmetrical apertures transparent to said radiant energy, each having an angular width equal to $\pi/n$ radians and bounded by two intersecting curves defined by two polar equations of the general form $r = (a \cos n\theta + b)^{1/2}$, wherein $r$ is the radius vector, $\theta$ is the polar angle, $a$ is any constant differing in the two equations, $b$ is any constant having the same value in both equations, and $n$ is any integer other than zero and having the same value in both equations; the other said member having $n$ uniformly spaced windows transparent to said radiant energy, each of like angular width, and further defined as an annular sector having radial straight-sided extremities, an inner arc of radius at least as small as the minimum radius vector of said aperture, and an outer arc of radius at least as large as the maximum radius vector of said aperture; and means for relatively rotating said members uniformly about said reference axis.

7. An apparatus for modulating the cross-sectional area of a beam of radiant energy propagated along a reference axis, comprising: a pair of planar members, each formed of material opaque to said radiant energy; said members being aligned upon and positioned perpendicularly to said reference axis; said members each having a reference origin defined therein by intersection of said reference axis therewith; one said member having formed therein at least one symmetrical aperture transparent to said radiant energy, having an angular width equal to $\pi/n$ radians and bounded by a curve defined in polar form by the equation $r = (a \cos n\theta)^{1/2}$, wherein $r$ is the radius vector, $\theta$ is the polar angle, $a$ is any constant, and $n$ is any integer other than zero; the other said member having at least one sector-shaped window, transparent to said radiant energy, of like angular width and of radial dimension at least as great as the maximum radius vector of said aperture; and means for relatively rotating said members uniformly about said reference axis.

8. An apparatus for modulating the cross-sectional area of a beam of radiant energy propagated along a reference axis, comprising: a pair of planar members, each formed of material opaque to said radiant energy; said members being aligned upon and positioned perpendicularly to said reference axis; said members each having a reference origin defined therein by intersection of said reference axis therewith; one said member having formed therein $n$ uniformly-spaced symmetrical apertures transparent to said radiant energy, each having an angular width equal to $\pi/n$ radians and bounded by a curve defined in polar form by the equation $r = (a \cos n\theta)^{1/2}$, wherein $r$ is the radius vector, $\theta$ is the polar angle, $a$ is any constant, and $n$ is any integer other than zero; the other said member having $n$ uniformly spaced sector-shaped windows transparent to said radiant energy, each of like angular width and of radial dimension at least as great as the maximum radius vector of said aperture; and means for relatively rotating said members uniformly about said reference axis.

References Cited in the file of this patent

UNITED STATES PATENTS

| | | |
|---|---|---|
| 1,337,737 | Van der Bijl | Apr. 20, 1920 |
| 1,475,583 | Hoxie | Nov. 27, 1923 |
| 2,014,741 | Lesti | Sept. 17, 1935 |
| 2,169,842 | Kannenberg | Aug. 15, 1939 |
| 2,376,493 | Land et al. | May 22, 1945 |